United States Patent
Kayahara (10) Patent No.: US 11,718,105 B2
(45) Date of Patent: Aug. 8, 2023

(54) PRINTING APPARATUS AND PRINTING METHOD

(71) Applicant: SEIKO EPSON CORPORATION, Tokyo (JP)

(72) Inventor: Naoki Kayahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/456,657

(22) Filed: Nov. 29, 2021

(65) Prior Publication Data

US 2022/0169042 A1 Jun. 2, 2022

(30) Foreign Application Priority Data

Nov. 30, 2020 (JP) .................................. 2020-198140

(51) Int. Cl.
*B41J 3/407* (2006.01)
*B41J 11/00* (2006.01)
*H04N 1/12* (2006.01)

(52) U.S. Cl.
CPC ........... *B41J 3/4078* (2013.01); *B41J 11/008* (2013.01); *H04N 1/128* (2013.01)

(58) Field of Classification Search
CPC .............................. B41J 3/4078; B41J 11/008
See application file for complete search history.

(56) References Cited

U.S. PATENT DOCUMENTS

| 2003/0030686 A1* | 2/2003 | Abe ....................... B41J 3/4078 347/16 |
| 2003/0110969 A1 | 6/2003 | Brunet-Manquat |
| 2004/0239705 A1* | 12/2004 | Arikita .................. B41J 3/4078 347/5 |
| 2005/0011386 A1 | 1/2005 | Brunet-Manquat |
| 2010/0194807 A1 | 8/2010 | Hirasawa et al. |
| 2017/0148154 A1 | 5/2017 | Nakao |

FOREIGN PATENT DOCUMENTS

| CN | 102673177 A | 9/2012 |
| EP | 3653391 A1 | 5/2020 |
| JP | H11-300949 A | 11/1999 |
| JP | 2007-313717 A | 12/2007 |
| JP | 2010-179544 A | 8/2010 |
| JP | 2017-096750 A | 6/2017 |
| WO | 01/78992 A1 | 10/2001 |
| WO | 2003/031190 A1 | 1/2005 |

* cited by examiner

*Primary Examiner* — Scott A Richmond (74) *Attorney, Agent, or Firm* — Global IP Counselors, LLP (57) ABSTRACT

A printing apparatus includes a pattern extracting unit for, based on a comparison between first image data representing a pattern and second image data generated by imaging a fabric transported, extracting a pattern region from the second image data, a printing image generation unit for arranging third image data representing an image to be printed overlaid on the pattern so that the third image data matches the pattern region to generate printing image data, and a printing control unit for causing a printing unit to print the printing image data on the fabric transported.

5 Claims, 7 Drawing Sheets

PRINTING APPARATUS AND PRINTING METHOD

The present application is based on, and claims priority from JP Application Serial Number 2020-198140, filed Nov. 30, 2020, the disclosure of which is hereby incorporated by reference herein in its entirety.

BACKGROUND

1. Technical Field

The present disclosure relates to a printing apparatus and a printing method.

2. Related Art

A technique has been known for searching an inspection target image for a candidate having similar characteristics to a model image obtained by imaging a good product serving as a model of the product (see JP 2017-96750 A).

Here, it is assumed that, when a fabric formed with a pattern is used as a printing medium, the pattern is extracted from a captured image obtained by imaging the fabric transported. Since the captured image is obtained sequentially in units of part in accordance with the transport of the fabric, a pattern is extracted in units of region obtained by partitioning the captured image by a certain area. However, there is a problem in that, for a pattern at a position spanning a boundary between such regions, it is not possible to extract the pattern even in pattern extracting processes with both the respective regions adjacent at the boundary as targets.

SUMMARY

A printing apparatus includes a transport unit configured to transport a fabric formed with a pattern in a transport direction, an imaging unit configured to image the fabric transported by the transport unit, a printing unit configured to perform printing on the fabric transported by the transport unit, a pattern extracting unit configured to, based on a comparison between first image data representing the pattern and second image data generated by imaging the fabric by the imaging unit, extract a pattern region corresponding to the pattern in the second image data, a printing image generation unit configured to arrange third image data representing an image to be printed overlaid on the pattern so that the third image data matches the pattern region extracted to generate printing image data, and a printing control unit configured to cause the printing unit to print the printing image data on the fabric, wherein the pattern extracting unit performs first extracting processing for extracting the pattern region from a first region of the second image data, and second extracting processing for extracting the pattern region from a second region of the second image data, a part of the second region is an overlapping region overlapping the first region, and a length in the transport direction of the overlapping region is equal to or greater than a length in the transport direction of the first image data.

A printing method includes a transport step for transporting a fabric formed with a pattern in a transport direction, an imaging step for imaging the fabric transported, a pattern extraction step for, based on a comparison between first image data representing the pattern and second image data generated by imaging the fabric, extracting a pattern region corresponding to the pattern in the second image data, a printing image generation step for arranging third image data representing an image to be printed overlaid on the pattern so that the third image data matches the pattern region extracted to generate printing image data, and a printing step for printing the printing image data on the fabric transported, wherein the pattern extraction step includes performing first extracting processing for extracting the pattern region from a first region of the second image data, and second extracting processing for extracting the pattern region from a second region of the second image data, a part of the second region is an overlapping region overlapping the first region, and a length in the transport direction of the overlapping region is equal to or greater than a length in the transport direction of the first image data.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

Figure 1:
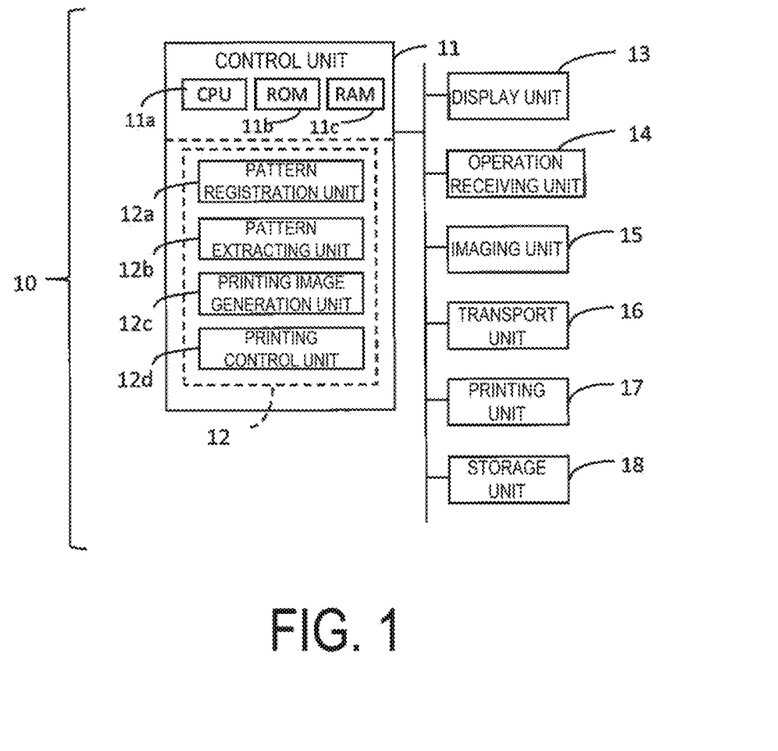
FIG. 1 is a block diagram illustrating a configuration of a printing apparatus in a simplified manner.

1. Apparatus Configuration:

FIG. 1 illustrates a configuration of a printing apparatus 10 according to the embodiment, in a simplified manner.

The printing apparatus 10 performs a printing method. The printing apparatus 10 is provided with a control unit 11, a display unit 13, an operation receiving unit 14, an imaging unit 15, a transport unit 16, a printing unit 17, a storage unit 18, and the like. The control unit 11 is configured to include, as a processor, one or more ICs including a CPU 11a, a ROM 11b, a RAM 11c, and the like, another non-volatile memory, and the like.

In the control unit 11, the processor, that is, the CPU 11a executes arithmetic processing in accordance with one or more programs 12 stored in the ROM 11b, the other memory, or the like, using the RAM 11c or the like as a work area, to control the printing apparatus 10. The control unit 11 functions, in accordance with the program 12, as a pattern registration unit 12a, a pattern extracting unit 12b, a printing image generation unit 12c, a printing control unit 12d, and the like. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13. The display unit 13 and the operation receiving unit 14 may be part of the configuration of the printing apparatus 10, or may be peripheral devices externally coupled to the printing apparatus 10.

The transport unit 16 is a mechanism for transporting a printing medium under control by the control unit 11. In the present exemplary embodiment, a fabric is assumed, as the printing medium, formed with a stereoscopic pattern by devising a weaving method of yarns and fibers, such as a jacquard woven fabric or a lace fabric. In the fabric, a certain pattern or a set of certain patterns are formed so as to be aligned repeatedly. In the following, a pattern or a set of patterns will be treated as one pattern.

The transport unit 16 includes, for example, a feeding roller for feeding a fabric before printing, which is wound in a roll shape, to downstream of transport, a belt or roller for further transporting the fabric fed, a winding roller for winding the fabric after the printing in a roll shape and collecting the fabric, a motor for rotating each roller or belt, or the like. In the following, upstream, and downstream of a transport direction by the transport unit 16 are described simply as upstream, and downstream.

The imaging unit 15 images the fabric transported by the transport unit 16 under control by the control unit 11. The imaging unit 15 has a configuration such as a light source that irradiates the fabric, an imaging element that receives reflected light from the fabric, and generates and outputs image data as an imaging result, or the like.

The printing unit 17 performs printing on the fabric transported by the transport unit 16 under control by the control unit 11. The printing unit 17 is provided downstream from the imaging unit 15. The printing unit 17 performs printing on the fabric based on printing image data transmitted from the control unit 11. The printing unit 17 can perform printing by discharging ink of a plurality of colors such as cyan, magenta, yellow, and black, for example, by an ink-jet method. According to the ink-jet method, the printing unit 17 performs printing on the fabric by discharging dots of ink from a nozzle (not illustrated) based on printing image data defining dot on or dot off of each ink for each pixel.

The storage unit 18 is a storage method such as a non-volatile memory or a hard disk drive. The storage unit 18 may be interpreted as a part of the control unit 11. Additionally, the RAM 11c may be interpreted as a part of the storage unit 18.

The printing apparatus 10 may be referred to as a recording device, an image forming device, a printer, or the like. The printing apparatus 10 may be realized not only by a single independent device, but also by a plurality of devices communicatively coupled to each other via a communication interface or a network. The printing apparatus 10 configured by a plurality of devices may be referred to as a printing system 10.

The printing system 10 is configured to include, for example, a printer including the imaging unit 15, the transport unit 16, and the printing unit 17, and one or more information processing devices that function as the control unit 11. The information processing device is, for example, a personal computer (PC), a server, a smart phone, a tablet terminal, or a device having the same degree of processing capability as those devices. In the printing system 10, a device serving as the control unit 11 may be referred to as an image processing apparatus, a printing control device, or the like. Of course, some devices that configure the printing system 10 may be considered as an invention.

Figure 2A:
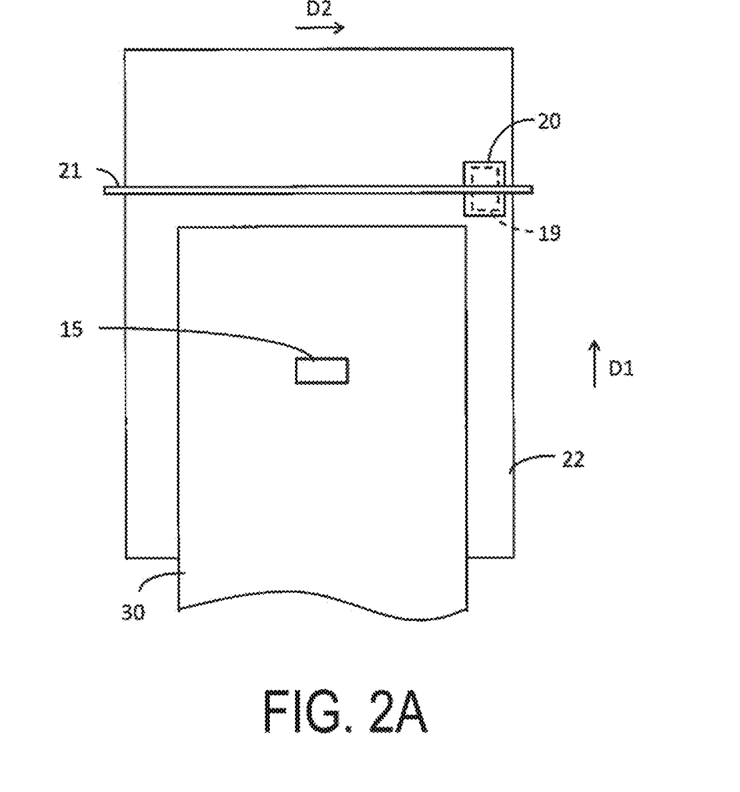
FIG. 2A is a view illustrating a configuration of a fabric to be transported and a vicinity thereof in a perspective facing downward from above.

FIG. 2A illustrates a configuration of a fabric 30 to be transported and a vicinity of the fabric 30 in a perspective facing downward from above. In FIG. 2A, a depiction of a pre-formed pattern in the fabric 30 is omitted. In FIG. 2A, a transport direction of the fabric 30 by the transport unit 16 is denoted by a reference sign D1. A reference sign 22 denotes an endless belt 22 as a portion of the transport unit 16. The fabric 30 in a state of being placed on the endless belt 22 is transported from upstream to downstream by the endless belt 22 rotating.

As illustrated in FIG. 2A, a carriage 20 is arranged above the endless belt 22. The carriage 20 can reciprocate along a direction D2 that intersects the transport direction D1. Although the intersection here is orthogonal, it may be understood that orthogonal includes not only strict orthogonality, but also errors that occur in product manufacturing. The carriage 20 moves along an elongated guide member 21 in the direction D2. The direction D2 is also referred to as a main scanning direction of the carriage 20 and a printing head 19. The direction D2 is also referred to as a width direction of the fabric 30.

The carriage 20 is equipped with the printing head 19. That is, the printing head 19 reciprocates along the width direction D2 with the carriage 20. Such a carriage 20 and a printing head 19 configure the printing unit 17. Although not illustrated, a plurality of nozzles open on a lower surface opposite the endless belt 22 in the printing head 19. The printing head 19 discharges ink from the nozzle based on printing image data while moving along the width direction D2 with the carriage 20.

As illustrated in FIG. 2A, the imaging unit 15 is arranged above the endless belt 22 at a predetermined position upstream of the carriage 20 and the printing head 19.

Figure 2B:
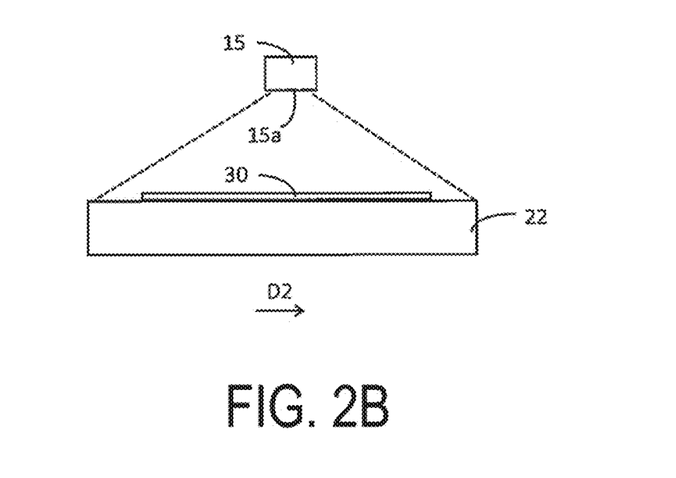
FIG. 2B is a view illustrating a part of the configuration illustrated in FIG. 2A in a perspective facing downstream from upstream.

FIG. 2B illustrates a part of the configuration illustrated in FIG. 2A in a perspective facing downstream from upstream. The imaging unit 15 has a lower surface opposite the endless belt 22 as an imaging surface 15a, and images the fabric 30 above the endless belt 22 via the imaging surface 15a. The imaging unit 15 is, for example, a line scan type camera in which a plurality of imaging elements are arranged inside thereof in the width direction D2. The imaging unit 15 repeats imaging on a line-by-line basis via a lens (not illustrated) and the imaging element provided at the imaging surface 15a. In FIG. 2B, an imaging range in the width direction D2 by the imaging unit 15 is illustrated by dashed lines. The imaging unit 15 is capable of imaging approximately an entire range of the endless belt 22 in the width direction D2 by a function of the lens.

The configuration of the imaging unit 15 is not limited to the example of FIGS. 2A and 2B. For example, a configuration may be adopted in which a plurality of the imaging units 15 are arranged above the endless belt 22 along the width direction D2, and each of the plurality of imaging units 15 takes charge of a partial range of the entire range of the endless belt 22 in the width direction D2 and performs imaging. Alternatively, the imaging unit 15 may be a line sensor configured by arranging the plurality of imaging elements over approximately the entire range of the endless belt 22 in the width direction D2. Alternatively, similar to the printing head 19 mounted on the carriage 20, the imaging unit 15 may be configured to be mounted on a carriage that can move along the width direction D2, and to image above the endless belt 22 while moving in the width direction D2 by the carriage.

Figure 3:
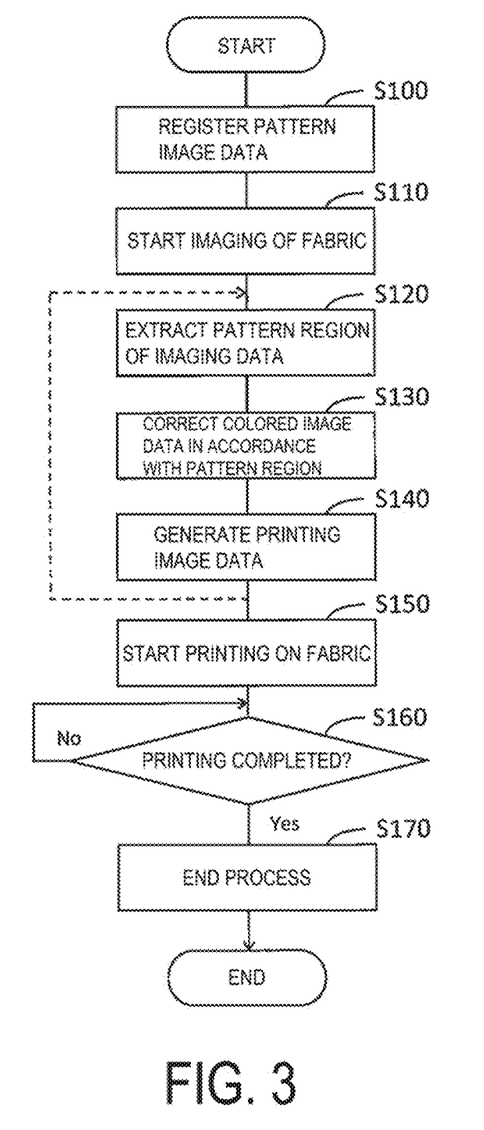
FIG. 3 is a flowchart illustrating printing processing.

2. Printing Method:

FIG. 3 illustrates, by a flowchart, printing processing that the control unit 11 performs in accordance with the program 12.

In step S100, the pattern registration unit 12a of the control unit 11 registers pattern image data representing a pattern formed in the fabric 30 with the storage unit 18. The pattern image data corresponds to "first image data", and step S100 corresponds to a registration step.

Figure 4:
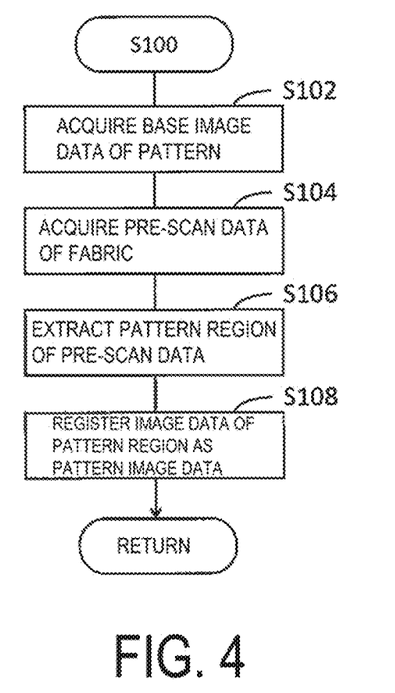
FIG. 4 is a flowchart illustrating details of step S100.

FIG. 4 illustrates details of step S100 by a flowchart.

In step S102, the pattern registration unit 12a acquires base image data representing the pattern in the fabric 30. The fabric 30 is a woven fabric in which, for example, one pattern designed by a designer is woven repeatedly. Therefore, it is assumed that the base image data is image data representing the one pattern that is generated in advance using predetermined software for design or drawing. The pattern registration unit 12a is input with base image data stored in a PC from the PC external to the printing apparatus 10, for example, in accordance with a user operation, and stores the input base image data in the storage unit 18.

In step S104, the pattern registration unit 12a acquires pre-scan data, which is image data generated by pre-scan of the fabric 30. The pre-scan means reading or imaging that is performed before imaging of the fabric 30 to be started in step S110 described below. For example, a user causes a scanner external to the printing apparatus 10 to scan the fabric 30 in advance. Then, the pattern registration unit 12a is input with image data generated by this scan from the scanner, and stores the image data as pre-scan data in the storage unit 18.

Alternatively, the pre-scan may be performed by the imaging unit 15. For example, the control unit 11 causes the transport unit 16 to start transporting the fabric 30, and causes the transport of the fabric 30 to stop at timing at which a tip of the fabric 30 reaches a position, which is downstream from the imaging unit 15 by a predetermined distance. The tip of the fabric 30 is an end portion facing downstream of the fabric 30. The imaging unit 15 images the fabric 30 passing by transporting under the imaging unit 15, and the pattern registration unit 12a is input with image data generated by this imaging from the imaging unit 15 and stores the image data as pre-scan data in the storage unit 18.

In step S106, the pattern registration unit 12a compares the base image data acquired in step S102 with the pre-scan data acquired in step S104 to extract, in the pre-scan data, a pattern region corresponding to one pattern of the fabric 30. At this time, the pattern registration unit 12a uses an image recognition technology to extract an image region with higher similarity with the base image data in the pre-scan data, and uses this image region as the pattern region.

Then, in step S108, the pattern registration unit 12a stores image data corresponding to the pattern region extracted in step S106 in the storage unit 18 as pattern image data. With the above, the registration of the pattern image data is completed.

According to the description according to FIG. 4, the pattern image data can be said to be at least a part of the pre-scan data.

However, the pattern registration unit 12a may simplify step S100 by registering base image data itself with the storage unit 18 as pattern image data.

Returning to the description of FIG. 3.

In step S110, the control unit 11 causes the imaging unit 15 to start imaging the fabric 30 that the transport unit 16 transports at predetermined velocity. That is, in step S110, a "transport step" of the fabric 30 is started. In addition, an "imaging step" is started by step S110. Image data on a line-by-line basis generated by the imaging of the fabric 30 by the imaging unit 15 is sequentially output to the control unit 11. The control unit 11 acquires two-dimensional imaging data, by sequentially storing the image data on a line-by-line basis from the imaging unit 15. The imaging data corresponds to "second image data".

In step S120, the pattern extracting unit 12b, based on a comparison between the pattern image data registered in step S100 and the imaging data generated by the imaging in step S110, extracts a pattern region corresponding to the pattern in the fabric 30 in the imaging data. In the imaging data, a plurality of the patterns are represented side by side. Therefore, the pattern extracting unit 12b extracts a pattern region for each of the patterns that are represented side by side in the imaging data. Step S120 corresponds to a "pattern extraction step".

Figure 5:
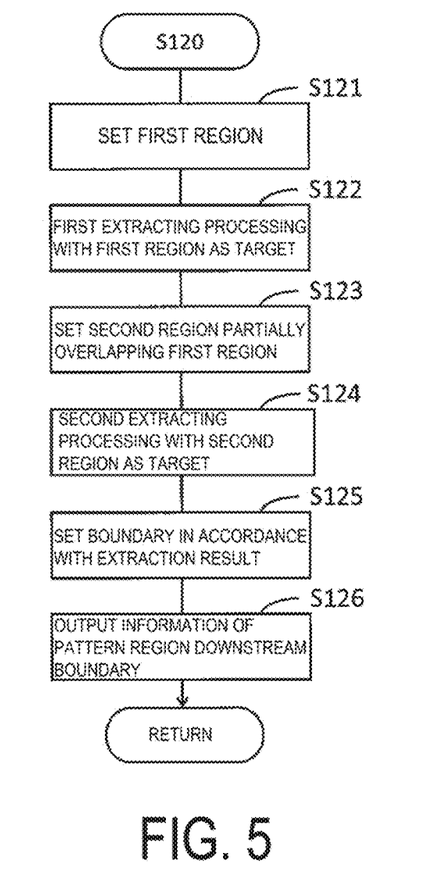
FIG. 5 is a flowchart illustrating details of step S120.

FIG. 5 illustrates details of step S120 by a flowchart.

In step S121, the pattern extracting unit 12b sets a first region of a predetermined size in the imaging data. In the present exemplary embodiment, an orientation of each image data, such as pattern image data, imaging data, and printing image data handled by the control unit 11 will also be described corresponding to the transport direction D1 and the width direction D2. In addition, for an end portion of image data or of a region in image data, an end portion downstream is referred to as a tip, and an end portion upstream is referred to as an end.

The pattern extracting unit 12b sets a length in the width direction D2 of the first region to be the same as a length in the width direction D2 of the imaging data. The length referred to here is, for example, the number of pixels. Additionally, when a length in the transport direction D1 of pattern image data is A, the pattern extracting unit 12b determines a length H equal or greater than A, and sets a length in the transport direction D1 of the first region to be H×2. For example, H=A, H=A×1.2, or H=A×1.5.

In step S122, the pattern extracting unit 12b performs first extracting processing for extracting a pattern region from the first region. It is sufficient that the pattern extracting unit 12b uses an image recognition technology to extract, as a pattern region, an image region having a degree of similarity with the pattern image data that is higher than a predetermined level. Specifically, the pattern extracting unit 12b extracts an edge of an image in the pattern image data, and similarly extracts an edge of an image in the imaging data. Then, an edge distribution in the pattern image data is repeatedly compared with an edge distribution in the imaging data, while a position is shifted, and while the pattern image data is deformed, and a region in which a degree of match between the edge distributions is highly evaluated above a predetermined level is extracted as one pattern region. With suchprocessing, the pattern extracting unit 12b extracts a pattern region from within a region of the imaging data that is a target at that time.

Here, when the width direction D2 is taken as an X-axis, and the transport direction D1 is taken as a Y-axis, coordinates of imaging data are defined in a two-dimensional plane according to the orthogonal X- and Y-axes. The processing of extracting a pattern region from imaging data is also processing of identifying coordinates of the pattern region in the imaging data. Note that, as in the processing in step S122, in step S106 described above, the pattern registration unit 12a can extract a pattern region in pre-scan data according to a degree of match of edge distributions between images to be compared.

In step S123, the pattern extracting unit 12b sets a second region upstream the first region in the imaging data, that overlaps a part of the first region in the transport direction D1. That is, the second region is set such that a tip of the second region is positioned downstream an end of the first region. A size of the second region is set to be the same as that of the first region. A region where the first region and the second region overlap is referred to as an OL region. OL is an abbreviation for overlap. In addition, a length in the transport direction D1 of the OL region is referred to as an OL distance, and the OL distance=H. Since a length in the transport direction D1 of each of the first region and the second region is H×2, half respective areas of the first region and the second region mutually overlap.

In step S124, the pattern extracting unit 12b performs second extracting processing for extracting a pattern region from the second region. A manner of extraction of a pattern region from within a region used as a target is the same as the first extracting process.

In step S125, the pattern extracting unit 12b sets, in accordance with the extraction result of the pattern region by steps S122 and S124, a line that is directed in a direction intersecting the transport direction D1, which is a boundary line corresponding to a boundary between the pattern regions in the first region or the second region. If the end of the first region corresponds to the boundary between the pattern regions, it is sufficient that the pattern extracting unit 12b sets the end of the first region as a boundary line.

In step S126, the pattern extracting unit 12b outputs information of the pattern region in the region downstream the boundary line set in step S125 to the printing image generation unit 12c for steps S130 and S140. Note that, as indicated by a dashed arrow in FIG. 3, the control unit 11, after starting imaging of the fabric 30 in step S110, repeats steps S120 to S140 in accordance with the imaging data obtained sequentially from the imaging unit 15. Therefore, in step S126, the pattern extracting unit 12b outputs information of the pattern region from the boundary line set in step S125 to the boundary line set in step S125 in the previous step S120 to the printing image generation unit 12c.

A specific example of steps S121 to S126 will be described with reference to FIG. 6. A reference sign 40 denotes pattern image data 40. The pattern image data 40 is image data representing a pattern designed with a petal shape as a motif. Of course, such a pattern may be more complex. A reference sign 41 denotes imaging data 41. Of the imaging data 41, a range indicated by a reference sign 41a is a target region 41a set as a region being a target for extracting a pattern region. Similarly, in the imaging data 41, a range indicated by a reference sign 41b is a target region 41b, a range indicated by a reference sign 41c is a target region 41c, and a range indicated by a reference sign 41d is a target region 41d. Although not illustrated in the drawing, such target regions are similarly and repeatedly set upstream the target region 41d.

The pattern extracting unit 12b sets the target regions 41a, 41b, 41c, 41d, and the like, as first regions or second regions in the imaging data 41. A length in the width direction D2 of any of the target regions 41a, 41b, 41c, 41d, and the like is the same as that of the imaging data 41, and a length in the transport direction D1 is H×2. As can be seen in FIG. 6, the target region 41b located upstream the target region 41a overlaps the target region 41a by the OL distance (=H) in the transport direction D1. Similarly, the target region 41c overlaps the target region 41b by the OL distance in the transport direction D1, and the target region 41d overlaps the target region 41c by the OL distance in the transport direction D1.

A region where the target regions 41a and 41b overlap is referred to as an OL region 41ab. Similarly, a region where the target regions 41b and 41c overlap is referred to as an OL region 41bc, and a region where the target regions 41c and 41d overlap is referred to as an OL region 41cd. When the target region 41a is a first region, the target region 41b corresponds to a second region. Similarly, when the target region 41b is a first region, the target region 41c corresponds to a second region. Similarly, when the target region 41c is a first region, the target region 41d corresponds to a second region. In the example of FIG. 6, H>A.

In step S120, which is first performed after step S110, that is, in the first step S120, the pattern extracting unit 12b sets the target region 41a as a first region in step S121, and extracts a pattern region by a comparison with the pattern image data 40 from the target region 41a in step S122. Then, the pattern extracting unit 12b sets the target region 41b as a second region in step S123, and extracts a pattern region by a comparison with the pattern image data 40 from the target region 41b in step S124. Each region separated by broken lines in the imaging data 41 is each pattern region 42 extracted by the pattern extracting unit 12b.

Figure 6:
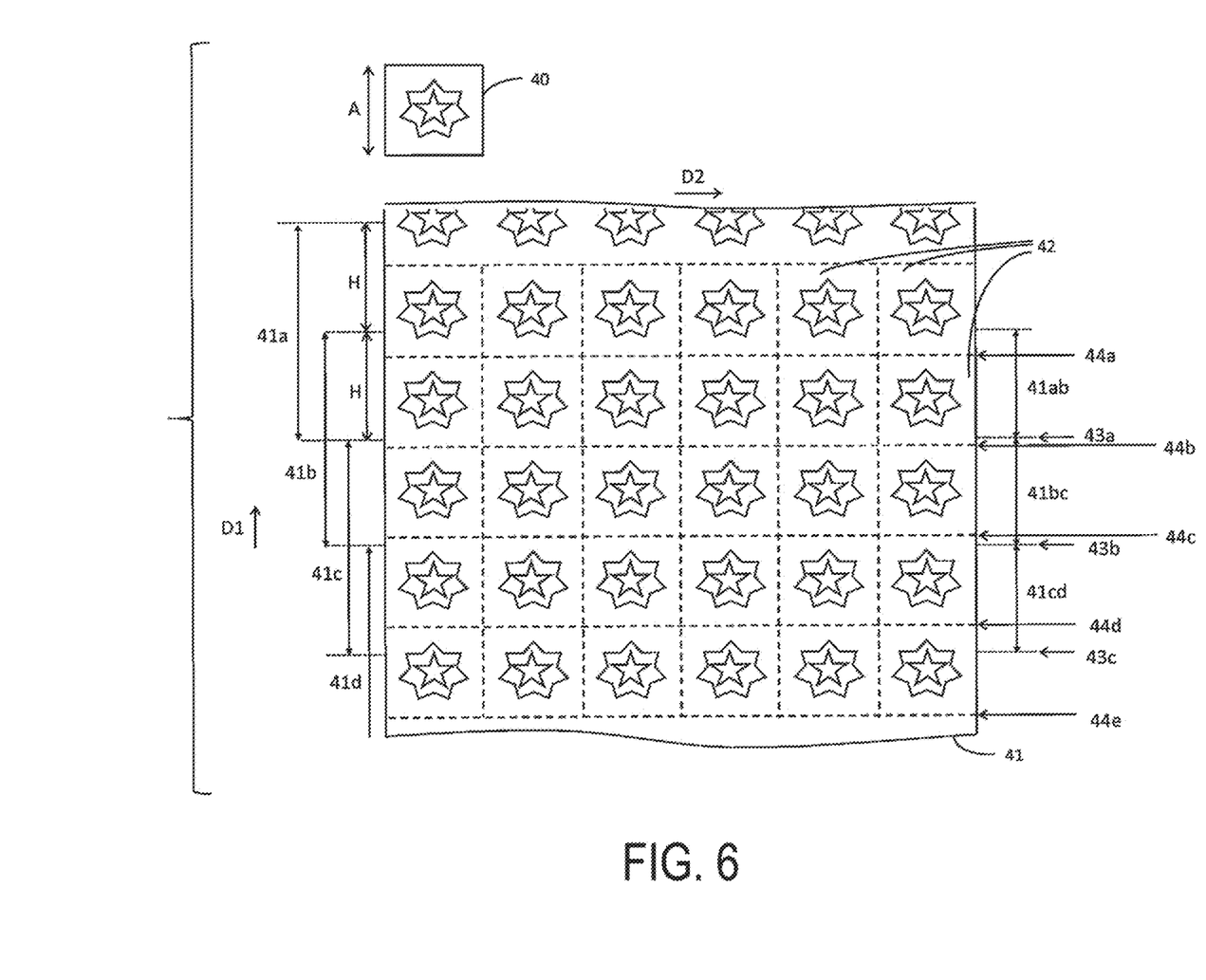
FIG. 6 is a diagram for explaining steps S121 to S126 by a specific example.

According to FIG. 6, the pattern region 42 extracted from the target region 41b as the second region spans an end 43a of the target region 41a as the first region. Thus, in step S125, the pattern extracting unit 12b sets a boundary 44a of the pattern region 42 downstream the end 43a or a boundary 44b of the pattern region 42 upstream the end 43a to a boundary line. Here, for example, it is assumed that the boundary 44a is set to the boundary line. Then, in step S126, the pattern extracting unit 12b outputs information of the pattern region 42 extracted in a region downstream the boundary line (boundary 44a) to the printing image generation unit 12c, and ends the first step S120.

In the second step S120, the pattern extracting unit 12b treats the target region 41b as a first region. However, the setting of the target region 41b and the extraction of the pattern region 42 from the target region 41b have been done by steps S123 and S124 of the first step S120. Thus, the pattern extracting unit 12b regards the second extracting processing performed in the previous step S120 as a first extracting processing in this time step S120, omits steps S121 and S122, sets the target region 41c as a second region in step S123, and extracts the pattern region 42 from the target region 41c in step S124. According to FIG. 6, the pattern region 42 extracted from the target region 41c as the second region spans an end 43b of the target region 41b as the first region. Thus, in step S125, the pattern extracting unit 12b sets a boundary 44c of the pattern region 42 downstream the end 43b or a boundary 44d of the pattern region 42 upstream the end 43b to a boundary line. Here, for example, it is assumed that the boundary 44c is set to the boundary line. Then, in step S126, the pattern extracting unit 12b outputs information of the pattern region 42 extracted in a region downstream the boundary line (boundary 44c), that is, a region from the boundary 44c to the boundary line (boundary 44a) set in the previous step S120, to the printing image generation unit 12c, and ends the second step S120.

The same applies hereinafter, but in the third step S120, the pattern extracting unit 12b treats the target region 41c as a first region, omits steps S121 and S122, sets the target region 41d as a second region in step S123, and extracts the pattern region 42 from the target region 41d in step S124. According to FIG. 6, the pattern region 42 extracted from the target region 41d as the second region spans an end 43c of the target region 41c as the first region. Thus, in step S125, the pattern extracting unit 12b sets a boundary 44e of the pattern region 42 upstream the end 43c to a boundary line, for example. Then, in step S126, the pattern extracting unit 12b outputs information of the pattern region 42 extracted in a region from the boundary line (boundary 44e) to the boundary line (boundary 44c) set in the previous step S120, to the printing image generation unit 12c, and ends the third step S120.

According to step S120, the pattern extracting unit 12b extracts a pattern region from the same position in the imaging data in each of the first extracting processing and the second extracting processing in some cases. For example, as illustrated in FIG. 6, each pattern region 42 sandwiched between the boundary 44b and the boundary 44c in the imaging data 41 is extracted both in the extracting processing from the target region 41b and the extracting processing from the target region 41c. However, as described above, the pattern extracting unit 12b outputs the information of the pattern region 42 from the boundary line set in step S125 to the boundary line set in step S125 in the previous step S120 to the printing image generation unit 12c. Thus, the pattern extracting unit 12b provides information of any one of the pattern region 42 extracted from the same position by the first extracting processing and the pattern region 42 extracted from the same position by the second extracting processing to the printing image generation unit 12c.

Returning to the description of FIG. 3.

In step S130, the printing image generation unit 12c corrects colored image data that represents an image to be printed overlaid on the pattern in the fabric 30 so that the colored image data matches a shape of the pattern region extracted in step S120. The colored image data corresponds to "third image data". The colored image data is pre-generated color image data representing a color to color one pattern, or a print range of a color. The colored image data is stored in advance in the storage unit 18, for example. Alternatively, the control unit 11 is input with colored image data stored in a PC from the PC external to the printing apparatus 10, for example, in accordance with a user operation, and stores the input colored image data in the storage unit 18.

A shape of the colored image data is an ideal shape of a pattern region having one pattern, for example a rectangle. On the other hand, a shape of each pattern region extracted from the imaging data in step S120 is basically a quadrangle, but does not necessarily match the shape of the colored image data. This is because distortion, expansion and contraction (hereinafter, distortion, and the like) may be generated in the fabric 30 being transported. Although not particularly depicted in FIG. 6, each pattern region 42 extracted from the imaging data 41 has a shape that is distorted, expanded and contracted due to distortion and the like of the fabric 30 in some cases.

Thus, the printing image generation unit 12c deforms the shape of the colored image data so as to match the individual shape of the pattern region extracted in step S120. As a deformation method, for example, an affine transformation including expansion, contraction, rotation, shear, and the like of an image, or another deformation method is used. Such deformation is a correction by step S130. According to FIG. 6, the boundary set in the imaging data 41 in step S125 is understood to be a straight line orthogonal to the transport direction D1, but depending on the shape of each pattern region 42 extracted, such a boundary is a straight line that diagonally intersect with the transport direction D1, or is a broken line in some cases. Depending on the shape of the pattern region 42, the correction in step S130 may be unnecessary as a result.

In step S140, the printing image generation unit 12c arranges a plurality of pieces of the colored image data after step S130 so as to correspond to an array of the plurality of pattern regions in the imaging data to generate printing image data. The printing image data is image data in which the plurality of pieces of colored image data after step S130 are combined, and is an image printed on a region of the fabric 30 as a target of imaging. Such steps S130 and S140 correspond to a "printing image generation step" for arranging third image data so as to match a pattern region extracted to generate printing image data.

Figure 7:
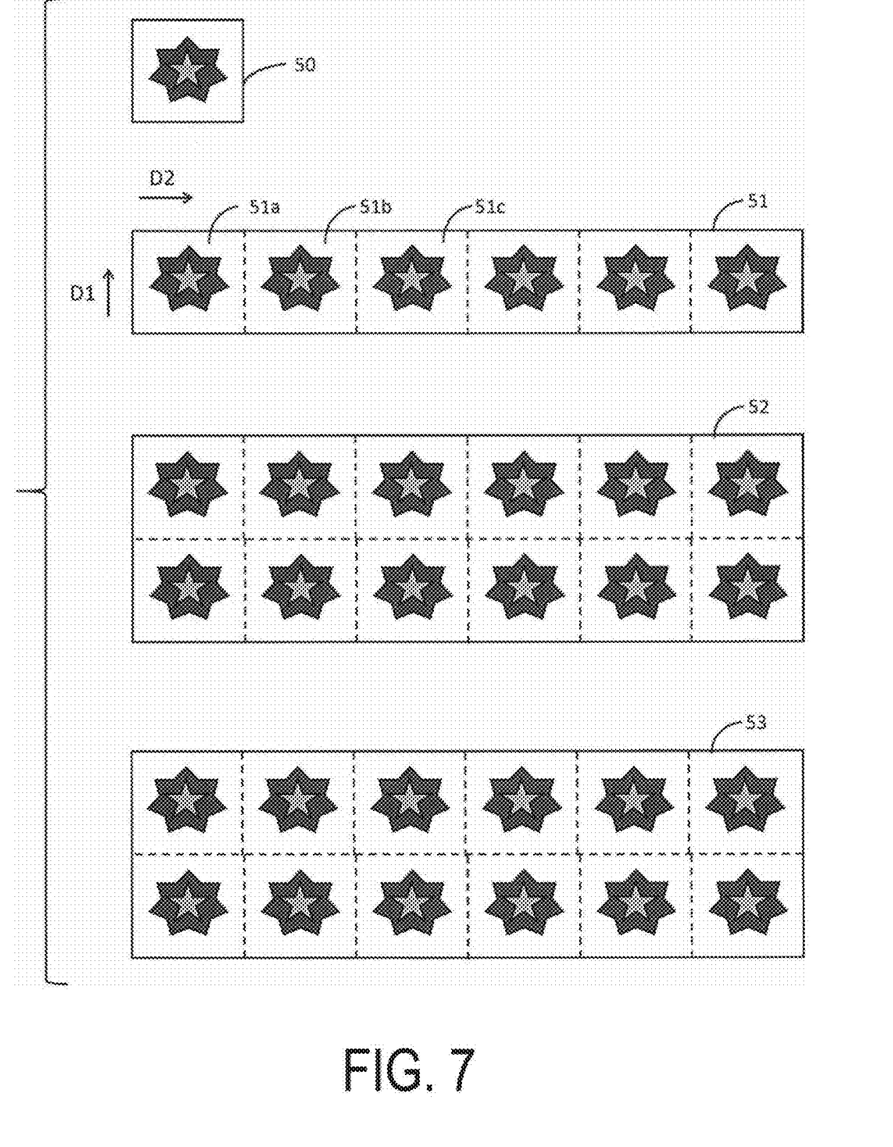
FIG. 7 is a diagram for explaining steps S130 and S140 by a specific example.

A specific example of steps S130 and S140 based on the description for FIG. 6 will be described with reference to FIG. 7. A reference sign 50 illustrates colored image data 50. The colored image data 50 may be interpreted as an image having the same or substantially the same size as the pattern image data 40. A reference sign 51a denotes colored image data 51a after the colored image data 50 is corrected so as to match a shape of one pattern region 42 downstream the boundary 44a (the leftmost in FIG. 6), indicated by the information provided from the pattern extracting unit 12b by step S126 in the first step S120. Similarly, a reference sign 51b denotes colored image data 51b after the colored image data 50 is corrected so as to match a shape of the pattern region 42 downstream the boundary 44a, which is the pattern region 42 adjacent in the width direction D2 to the pattern region 42 to which the colored image data 51a corresponds. Similarly, a reference sign 51c denotes colored image data 51c after the colored image data 50 is corrected so as to match a shape of the pattern region 42 downstream the boundary 44a, which is the pattern region 42 adjacent in the width direction D2 to the pattern region 42 to which the colored image data 51b corresponds.

Such pieces of colored image data 51a, 51b, 51c, and the like combined in accordance with an arrangement of the pattern regions 42 downstream the boundary 44a, form printing image data 51. That is, the printing image data 51 is printing image data generated by arranging the colored image data 50 so as to match each pattern region 42 extracted in the first step S120.

Similarly, the printing image data 52 is printing image data generated by arranging the colored image data 50 so as to match each pattern region 42 present in a region from the boundary 44c to the boundary 44a extracted in the second step S120.

Then, the printing image data 53 is printing image data generated by arranging the colored image data 50 so as to match each pattern region 42 present in a region from the boundary 44e to the boundary 44c extracted in the third step S120.

In step S150, the printing control unit 12d starts printing of the printing image data generated in step S140 on the fabric 30. In other words, a "printing step" is started by step S150. With reference to the example in FIG. 7, the printing image generation unit 12c that sequentially generates pieces of the printing image data 51, 52, 53, and the like, by repeating steps S130 and S140, outputs the pieces of printing image data 51, 52, 53, and the like, to the printing control unit 12d in an order of generation. The printing control unit 12d appropriately performs various types of necessary processing such as so-called color conversion processing and halftone processing on the printing image data acquired from the printing image generation unit 12c, to convert the printing image data into printing image data in a format used by the printing unit 17 for printing. The printing control unit 12*d* may temporarily accumulate the printing image data after such conversion in a buffer.

Then, the printing control unit 12*d* transfers the printing image data after the above conversion to the printing unit 17, and causes the printing unit 17 to start printing by movement of the carriage 20 and ink discharge from the printing head 19 based on the printing image data at predetermined timing at which a position of the fabric 30 for which imaging is started by step S110 reaches below the printing head 19. As a result, a color image represented by the individual colored image data constituting the printing image data is printed overlaid on the pattern in a shape that matches the individual pattern in the fabric 30.

The transport unit 16 is provided with an encoder that detects an amount of rotation of rollers and belts rotating for transport. The printing control unit 12*d* computes a transport distance of the fabric 30 in accordance with a detection signal from the encoder. Accordingly, the printing control unit 12*d* can grasp a current position in the transport direction D1 of the fabric 30 for which imaging is started by step S110, and can cause the printing unit 17 to start printing on the fabric 30 at timing at which the position reaches below the printing head 19.

After printing is started in step S150, the control unit 11 determines whether to end the printing or not (step S160). When ending the printing, the control unit 11 determines "Yes" and proceeds to end processing in step S170. The control unit 11 determines to end the printing when, for example, the end of printing is instructed by a user, or when the transport of the fabric 30 by a predetermined length is completed.

In the end processing in step S170, the control unit 11 stops imaging of the fabric 30 by the imaging unit 15. In addition, the control unit 11 stops driving the transport unit 16 and the printing unit 17 after causing the printing unit 17 to perform printing based on the printing image data generated in one cycle of the last steps S120 to S140, and ends the flowchart in FIG. 3. Of course, the control unit 11 may stop the transport unit 16 after controlling necessary processing such as collection of the fabric 30 by a winding roller.

3. Summary

As described above, according to the present exemplary embodiment, the printing apparatus 10 includes the transport unit 16 configured to transport the fabric 30 formed with a pattern in the transport direction D1, the imaging unit 15 configured to image the fabric 30 transported by the transport unit 16, the printing unit 17 configured to perform printing on the fabric 30 transported by the transport unit 16, the pattern extracting unit 12*b* configured to, based on a comparison between first image data representing the pattern and second image data generated by imaging the fabric 30 by the imaging unit 15, extract the pattern region 42 corresponding to the pattern in the second image data, the printing image generation unit 12*c* configured to arrange third image data representing an image to be printed overlaid on the pattern so that the third image data matches the pattern region 42 extracted to generate printing image data, and the printing control unit 12*d* configured to cause the printing unit 17 to print the printing image data on the fabric 30. Then, the pattern extracting unit 12*b* performs first extracting processing for extracting the pattern region 42 from a first region of second image data, and second extracting processing for extracting the pattern region 42 from a second region of the second image data. A part of the second region is an OL region that overlaps the first region, and a length in the transport direction D1 of the OL region, that is an OL distance, is equal to or greater than a length A in the transport direction D1 of the first image data.

According to the configuration, the pattern extracting unit 12*b* overlays the first region used as the target for the first extracting processing on the second region used as the target for the second extracting processing by the OL distance in the transport direction D1. As a result, a pattern region at a position spanning an end of the first region is not extractable in the first extracting processing, but is always in the second region, thus is extractable in the second extracting process. Therefore, omission of extraction of the pattern region from the second image data can be eliminated. A specific description will be given with reference to FIG. 6. For example, when extraction of the pattern region 42 from the target region 41*c* is attempted, each pattern region 42 at a position spanning the end 43*c* of the target region 41*c* cannot be extracted, but using the target region 41*d* that overlaps the target region 41*c* in the transport direction D1 by the OL distance (=H) as an extraction target of the pattern region 42, each pattern region 42 at a position spanning the end 43*c* can be extracted.

In addition, according to the present exemplary embodiment, the pattern extracting unit 12*b*, when extracting the pattern region 42 from the same position of the second image data in each of the first extracting processing and the second extracting processing, provides information of any one of the pattern region 42 extracted from the same position by the first extracting processing and the pattern region 42 extracted from the same position by the second extracting processing, to the printing image generation unit 12*c* for generation of printing image data.

According to the configuration, it is possible to avoid repeatedly providing information about the same pattern region 42 to the printing image generation unit 12*c*. This makes it possible to avoid situations in which the same image represented by the third image data is overlaid and printed a plurality of times on a certain pattern in the fabric 30.

In addition, according to the present exemplary embodiment, the pattern extracting unit 12*b*, after the second extracting processing, sets, in the first region or the second region, a line that is directed in a direction intersecting the transport direction D1 and is a boundary line corresponding to a boundary between the pattern regions 42 extracted, and provides information of the pattern region 42 in a region downstream in the transport direction D1 of the boundary line to the printing image generation unit 12*c* for generation of printing image data.

According to the configuration, the information of the pattern region 42 that could be extracted at the time when the second extracting processing ended is provided to the printing image generation unit 12*c*, thus there is no omission of recognition of the pattern region 42 by the printing image generation unit 12*c*.

In addition, according to the present exemplary embodiment, the pattern extracting unit 12*b* sets a length in the transport direction D1 of the first region and a length in the transport direction D1 of the second region to twice the OL distance.

According to the configuration, the pattern extracting unit 12*b* can use each position in the second image data as an extract target of the pattern region two times.

However, when the OL distance is equal to or greater than the length A in the transport direction D1 of the first image data, the length in the transport direction D1 of the first region and the length in the transport direction D1 of the second region are not limited to twice the OL distance. The pattern extracting unit 12b may, for example, set each of the length in the transport direction D1 of the first region and the length in the transport direction D1 of the second region to three times the OL distance. Further, the pattern extracting unit 12b may, for example, set each of the length in the transport direction D1 of the first region and the length in the transport direction D1 of the second region to 1.5 times the OL distance. Of course, the length in the transport direction D1 of the first region and the length in the transport direction D1 of the second region are each a length greater than the OL distance.

The present exemplary embodiment also discloses an invention of various categories, such as a system, a program, and a method other than the printing apparatus 10.

A printing method includes a transport step for transporting the fabric 30 formed with a pattern in the transport direction D1, an imaging step for imaging the fabric 30 transported, a pattern extraction step for, based on a comparison between first image data representing the pattern and second image data generated by imaging the fabric 30, extracting the pattern region 42 corresponding to the pattern in the second image data, a printing image generation step for arranging third image data representing an image to be printed overlaid on the pattern so that the third image data matches the pattern region 42 extracted to generate printing image data, and a printing step for printing the printing image data on the fabric 30 transported. Then, the pattern extraction step includes performing first extracting processing for extracting the pattern region 42 from a first region of second image data, and second extracting processing for extracting the pattern region 42 from a second region of the second image data. A part of the second region is an OL region that overlaps the first region, and a length in the transport direction D1 of the OL region, that is an OL distance, is equal to or greater than a length A in the transport direction D1 of the first image data.

4. Other Descriptions

The pattern extracting unit 12b can change an OL distance in accordance with a length A in the transport direction D1 of first image data. For example, by setting a value obtained by multiplying the length A in the transport direction D1 of the pattern image data 40 by a predetermined coefficient α (where α≥1) to H or the OL distance, and setting each of a length in the transport direction D1 of a first region and a length in the transport direction D1 of a second region to H×2, the pattern extracting unit 12b changes the OL distance or a size of each of the first region and the second region in accordance with the length A.

Alternatively, the pattern extracting unit 12b determines A1×α×2 as a fixed length in the transport direction D1 of each of the first region and the second region, based on the maximum value A1 assumed for the length A. Moreover, the pattern extracting unit 12b may set the OL distance as A×α in accordance with the length A of the actual pattern image data 40. With such a configuration, an area of the OL region between the first region and the second region can be changed in accordance with the length A without changing the size of each of the first region and the second region.

In the example in FIG. 2A, the configuration of a so-called serial printer has been disclosed in which the printing head 19 is moved while being mounted on the carriage 20, but the printing head 19 may be a so-called line type head. That is, the printing head 19 may be an elongated printing head that is not mounted on the carriage 20 and that can cover a width of the fabric 30 along the width direction D2.

In FIGS. 2A and 2B, the configuration denoted by the reference sign 22 need not be the endless belt, and may be a platen as a platform that supports the fabric 30 from below. That is, it may be understood that the fabric 30 transported by a roller (not illustrated) moves over the platen.

The present exemplary embodiment can also be applied to a case where a material other than the fabric 30, for example, a paper printing medium, formed with a pattern is used for printing.

What is claimed is:

1. A printing apparatus, comprising:
 a transport unit configured to transport a fabric formed with a pattern in a transport direction;
 an imaging unit configured to image the fabric transported by the transport unit;
 a printing unit configured to perform printing on the fabric transported by the transport unit;
 a pattern extracting unit configured to, based on a comparison between first image data representing the pattern and second image data generated by imaging the fabric by the imaging unit, extract a pattern region corresponding to the pattern in the second image data;
 a printing image generation unit configured to arrange third image data representing an image to be printed overlaid on the pattern so that the third image data matches the pattern region extracted, to generate printing image data; and
 a printing control unit configured to cause the printing unit to print the printing image data on the fabric, wherein
 the pattern extracting unit performs
 first extracting processing for extracting the pattern region from a first region of the second image data, and
 second extracting processing for extracting the pattern region from a second region of the second image data,
 a part of the second region is an overlapping region overlapping the first region, and
 a length in the transport direction of the overlapping region is equal to or greater than a length in the transport direction of the first image data.

2. The printing apparatus according to claim 1, wherein the pattern extracting unit, when extracting the pattern region from the same position of the second image data in each of the first extracting processing and the second extracting processing, provides information of any one of the pattern region extracted from the same position by the first extracting processing and the pattern region extracted from the same position by the second extracting processing, to the printing image generation unit for generation of printing image data.

3. The printing apparatus according to claim 1, wherein the pattern extracting unit,
 after the second extracting processing, sets, in the first region or the second region, a line that is directed in a direction intersecting the transport direction and is a boundary line corresponding to a boundary between the pattern regions extracted, and
 provides information of the pattern region in a region downstream in the transport direction from the boundary line to the printing image generation unit for generation of the printing image data.

4. The printing apparatus according to claim 1, wherein the pattern extracting unit sets a length in the transport direction of the first region and a length in the transport direction of the second region to twice a length in the transport direction of the overlapping region.

5. The printing apparatus according to claim 1, wherein the pattern extracting unit changes a length in the transport direction of the overlapping region in accordance with the length in the transport direction of the first image data.

* * * * *